E. R. CAHOONE.
COMBINED GAS AND SOLID FUEL BURNING STOVE.
APPLICATION FILED OCT. 13, 1910.
991,272.
Patented May 2, 1911.
3 SHEETS—SHEET 1.
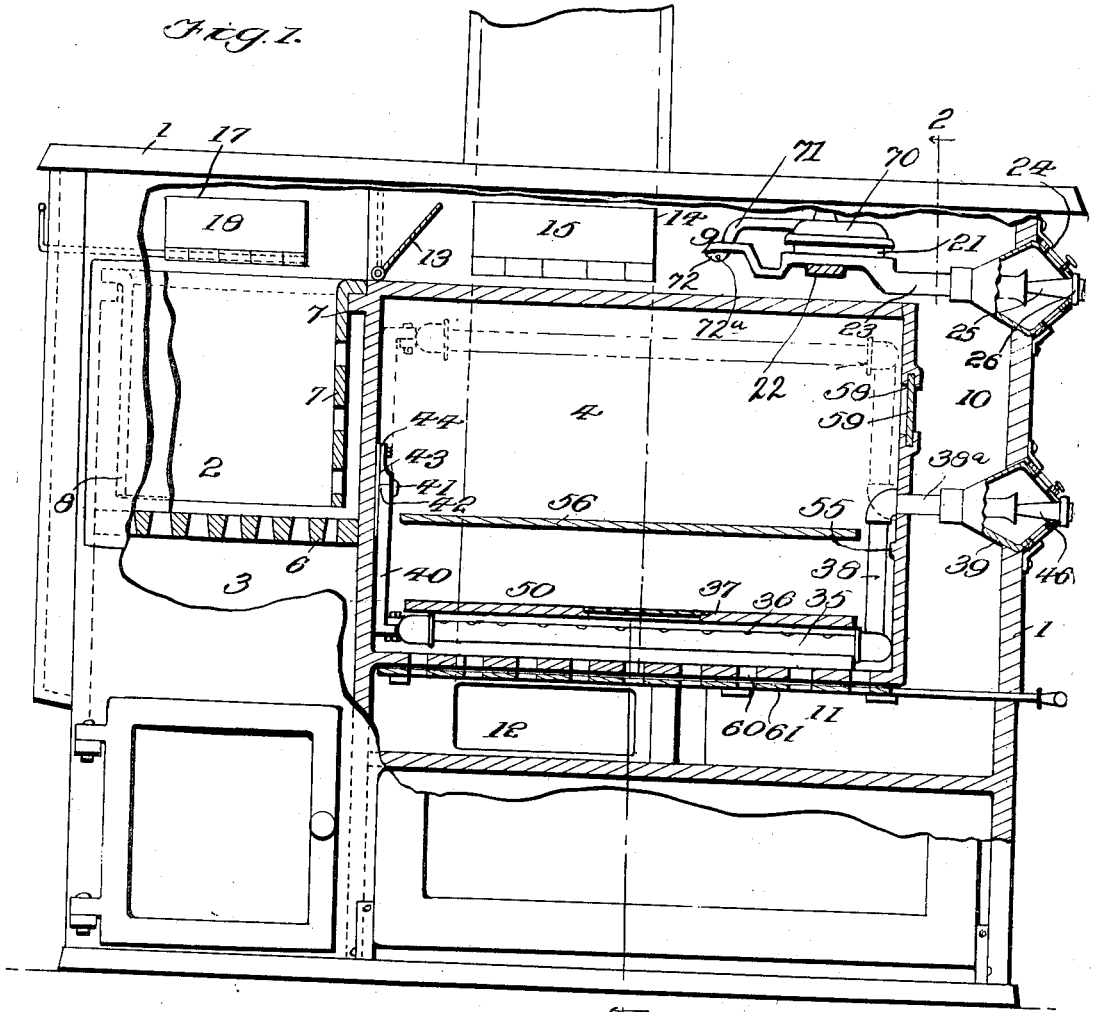
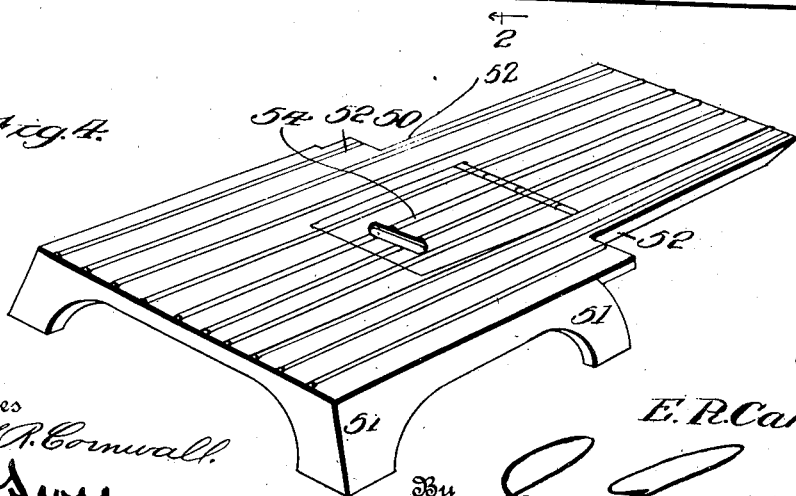
Witnesses
Inventor
E. R. Cahoone
By
Attorney E. R. CAHOONE.
COMBINED GAS AND SOLID FUEL BURNING STOVE.
APPLICATION FILED OCT. 13, 1910.
991,272.
Patented May 2, 1911.
3 SHEETS—SHEET 2.
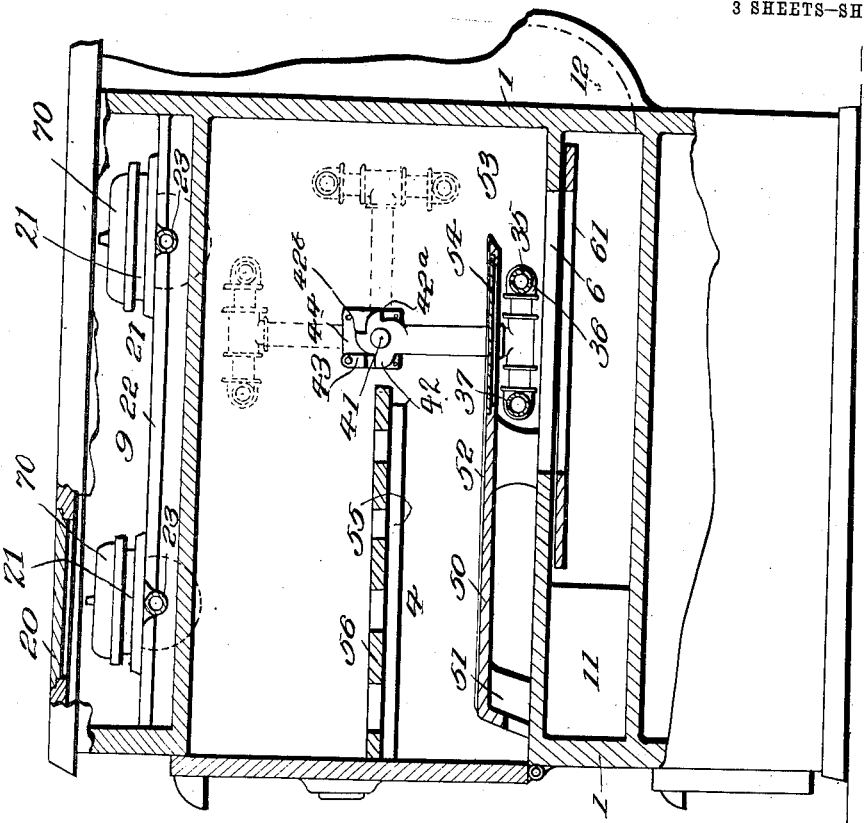
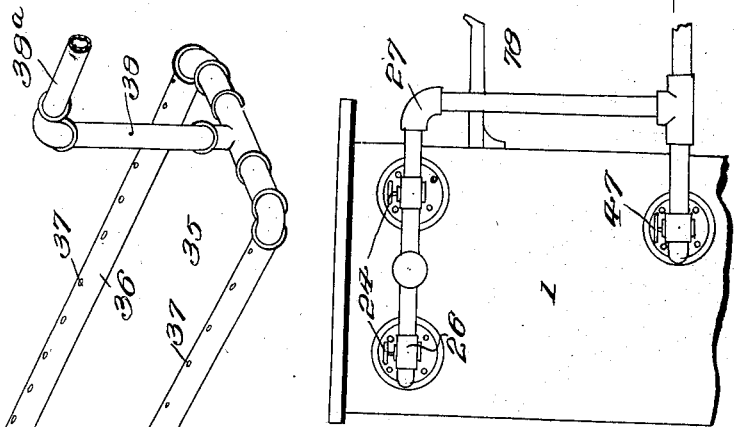
Inventor
E. R. Cahoone.
By
Attorney
Witnesses E. R. CAHOONE.
COMBINED GAS AND SOLID FUEL BURNING STOVE.
APPLICATION FILED OCT. 13, 1910.
991,272.
Patented May 2, 1911.
3 SHEETS—SHEET 3.
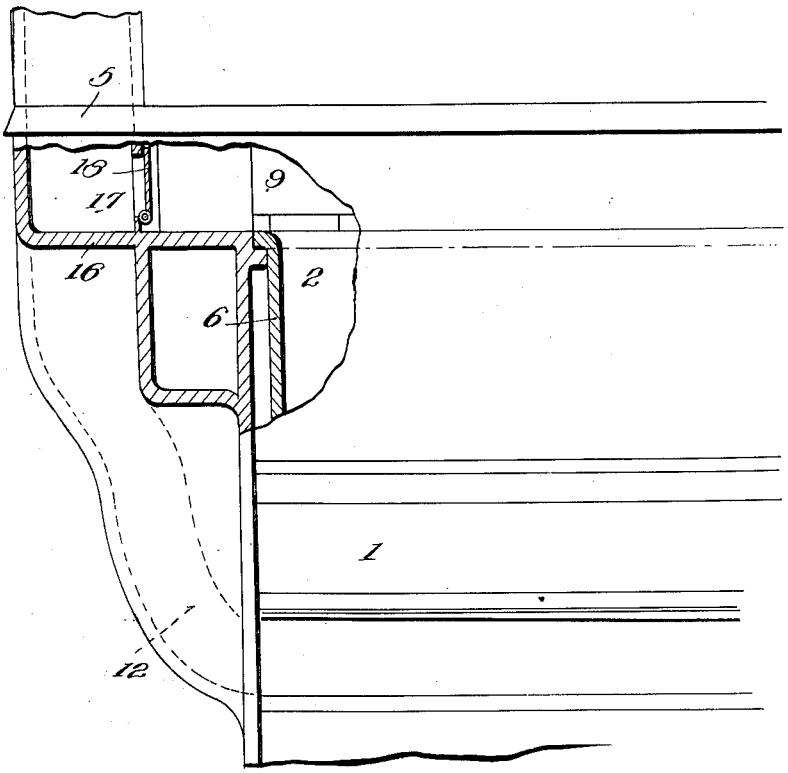
Fig. 5.
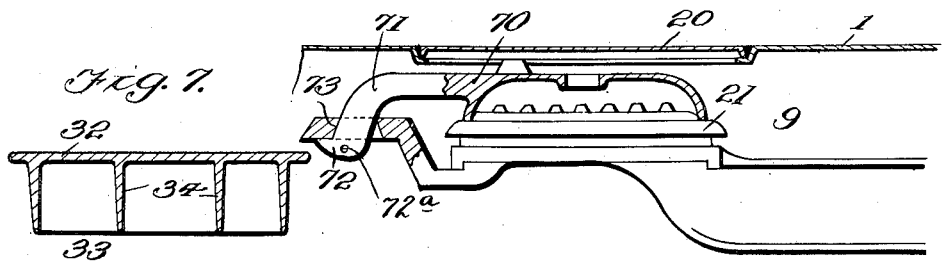
Fig. 7.   Fig. 6.   Fig. 10.
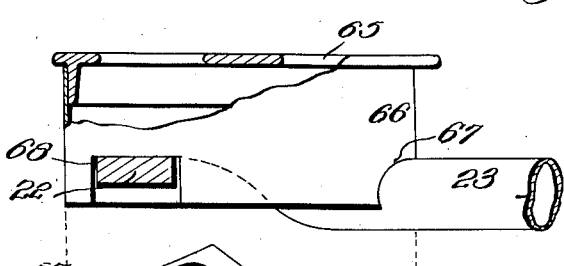
Fig. 9.
Witnesses
Inventor
E. R. Cahoone.
By
Attorney
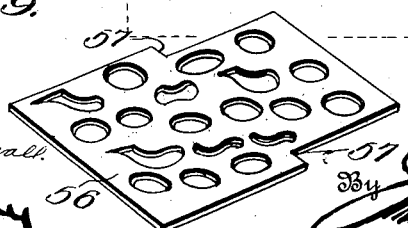

UNITED STATES PATENT OFFICE.

EDWIN R. CAHOONE, OF TROY, NEW YORK.

COMBINED GAS AND SOLID-FUEL BURNING STOVE.

991,272.

Specification of Letters Patent. Patented May 2, 1911.

Application filed October 13, 1910. Serial No. 586,891.

*To all whom it may concern:*

Be it known that I, EDWIN R. CAHOONE, a citizen of the United States, residing at Troy, in the county of Rensselaer and State of New York, have invented certain new and useful Improvements in Combined Gas and Solid-Fuel Burning Stoves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in a combined gas and solid fuel burning stove.

The object of the invention is to provide a stove structure having a fire pot in which coal or other like fuel may be used, and an arrangement of burners for using gaseous fuel, if it be found that a smaller fire be desired than could be made with the solid. To accomplish this object I have devised certain specific means for convenience and economy in operating the stove which makes it possible with safety to burn either class of fuel without liability of accident.

The invention also relates to the construction and arrangement of the gas burners, to adapt them to a stove of this type, whereby the best result can be obtained, without liability of injuring or clogging the burner openings when solid fuel is used.
A further object of the invention is to provide a pivotally supported gas burner in the oven for a combined stove of the type set forth, which may be adjusted to suit the convenience and circumstances of cooking the food and which may be used with the solid fuel fire, if the latter be low to increase the heat in the oven.

The invention also comprehends improvements in the specific construction and arrangement of parts which will be hereinafter described and particularly pointed out in the claims.

In the drawings:—Figure 1 is a view partially in section, and partially in elevation to illustrate the details of construction of my improved stove. Fig. 2 is a transverse section on the line 2, 2, Fig. 1. Fig. 3 is a detail perspective view of the oven gas burner. Fig. 4 is a detail view of a shelf used in the oven. Fig. 5 is an end view partially in section to illustrate the auxiliary flue. Fig. 6 is a view of a device used to coöperate with the gas burners. Fig. 7 is a detail view of a cover plate for the burner. Fig. 8 is an end view of the stove. Fig. 9 is a detail view of the upper oven shelf. Fig. 10 is a view of one of the gas burners and its cover.

1 indicates a casing, in which is located a fire pot 2 for solid fuel, an ash pit 3, an oven 4, and an exit opening 5.

The fire pot has the usual grate 6, lining 7, and door 8. The upper edges of the lining terminate some distance from the top of the casing and the top of the oven is also spaced from the top of the casing to provide a main flue 9. The main flue 9 extends down on one side of the oven as at 10, and then under the oven as at 11, and communicates with a flue 12 at the back of the casing, which leads into the exit opening 5. A damper 13, is located at the mouth of the main flue 9, and is designed to cut off communication between the fire pot 2, and the main flue surrounding the oven 4. An opening 14, is formed in the rear wall of the main flue 9, and coöperating therewith is a damper 15, by means of which, if it be desired, when a fire is in the fire pot direct communication with the exit opening 5, may be had.

In the rear of the casing 1, is a casting 16, in which is formed an auxiliary flue 17, which communicates with the exit opening 5 and the fire pot 2 so that if the gas burners be in use, and a smoldering fire should be in the fire pot, a damper 18, may be opened and the gases will escape direct to the exit opening 5. By this arrangement, there will be no liability of the gas from the burners becoming accidentally ignited by the fire in the fire pot, as the main flue in which the burners are located is entirely cut off from the fire in the fire pot.

Located in the main flue 9 under the lids 20, are gas burners 21, each of which is spaced from the walls of the main flue to permit a free circulation of air around them to improve the combustion when they are in use. The burners are supported on a cross bar 22, secured to the casing, and communicating with each burner is a pipe 23, extending through the end wall of the casing. The end of each pipe 23 is open for the admission of a mixture of gas and air, regulated by valves 24. Fitting in the open ends of the pipes 23, are nozzles 25, attached to short pipes 26, which communicate with a pipe 27.

Each burner 21, is provided with an extension formed with an opening 73. Fitting over the burner is a cover or protector 70, formed with a projection 71, the end of which is provided with a hook 72. The hooked end 72, is fitted in the opening 73, to provide a pivotal connection for the cover, a pin 72ª passing through an opening in the hook below the extension of the burner to retain the parts in position. By this construction the cover 70, may be turned on the pivotal connection to uncover the burner when the latter is to be used. Furthermore, by removing the pin 72ª, and removing the lids of the stove over the burner the cover 70 may be tilted upwardly and the hooked end disengaged from the opening 73, whereby the cover can be detached from said burner. The cover 70, protects the burner from the products of combustion passing through the main flue 9, when burning solid fuel in the fire pot, and thereby prevents foreign substances clogging the burner openings.

In the oven 4, is mounted a swinging burner, which I regard as of importance in my improved stove structure. This burner indicated at 35, comprises two parallel pipes 36 formed with openings 37, and are connected at their ends, from which connection leads a pipe 38, which lies close to one wall of the oven. The end of the pipe 38 turns outwardly at 38ª through the wall of the oven and the adjacent wall of the casing and into a bearing 39, the outwardly extended portion 38ª forming a journal. To the opposite end of the connection between the two parallel pipes 36, is attached an arm 40, pivotally mounted on a bolt 41, which is in alinement with the outwardly extended portion 38ª, and forms the other support for the burner. The upper end of the arm 40, is formed with preferably three teeth or stops 42, 42ª and 42ᵇ with which coöperates a locking dog 43 pivoted to a plate 44, secured on the inside of the oven to provide a substantial support for one side of the burner. The teeth are so arranged that the burner may be held in its lowermost position to heat the lower part of the oven, or it may be held in elevated position as shown in Fig. 2, when it is desired to broil, or it may be turned to be held against the rear wall of the oven and out of the way, as shown in Fig. 2. A nozzle 46, having a valve 47, extends in the open end of the extended portion 38ª, of the burner, and it is connected to the gas supply pipe 27. In either operative position of the burner, the gas will flow freely through the pipes which enables one to broil an article of food, or cook it in the usual manner in the same oven and with great economy and convenience.

Fitting in the bottom of the oven is a removable shelf 50, having legs 51, and its sides at the rear are reduced at 52, to permit it to be slid in and out without interfering with the burner. This shelf terminates short of the rear wall of the oven to form a space 53, for the free passage of the pivoted burner when it is turned from one position to the other. In the shelf I provide a hinged door 54, to permit access to the burner when it is in its lowermost position, to facilitate lighting the gas. This door when closed forms a continuation of the shelf, as shown in the drawings.

On the sides of the oven approximately half way between the top and bottom are ribs 55, on which rests a shelf 56, to support vessels or the like. This shelf is cut away on its rear side edges, as at 57, and at the rear to allow of the burner being swung into either the upper or lower position. In the upper side portion of the oven are openings 58, controlled by a damper 59, for the escape of odor from the cooking food to the main flue, and in the bottom of the oven are openings 60, controlled by a damper 61, to admit air to assist the combustion when the gas burners are operating.

When using the gas burners I may use a device for confining the flame, which I find in some cases is advantageous. This device comprises a grating 65, on which a vessel is supported, and from the grating depends an apron 66, formed with a notch 67, to straddle the pipe 23, and notches 68, to straddle the supporting bar 22. When this device is employed the apron confines the flame, and condenses it under the vessel, and yet there will be sufficient air from the main flue 9 to mix with the gas escaping from the burner to materially assist in promoting the combustion.

In operation, if a fire be desired of solid fuel, the latter is placed in the fire pot, and lighted in the usual manner. The burners 21, however are protected by the covers 70, the damper 18 is closed, and the damper 13 is opened. If it be desired to direct the products of combustion to the main flue 9, without passing around the oven, then damper 15 is opened but if it be desired to heat the oven, damper 15 is closed, and the products of combustion will pass through the main flue to the exit opening 5. As far as this part of the construction is concerned the stove operates the same as stoves in common use. But if it be desired to use the gas for light cooking the damper 18 will be opened, and dampers 13 and 15 closed, and the covers 70 will be turned to one side and the burner or burners 21 lighted. The draft in the main flue entirely surrounds the burners, and when a plain lid is in position or a vessel is placed over the hole in the top of the stove, and the burner, the confined air mixes with the gas and materially improves the combustion. If at this time there should be a light fire in the fire pot, too low to be of service, it will be obvious that by opening the damper 18 as described, the gases will escape direct to the exit opening, and that there could be no possibility of the flame or a spark escaping through the main flue 9 to the burners. While it would likely be a remote condition for a spark or the flame from the fire pot interfering with the burner, yet it is a possibility, and if gas should be in the burners at the time it might cause damage. It is primarily for this reason that I have so arranged the parts.

To bake food in the oven, the burner 35 is thrown down by means of the journals, and it is thus supported close to the bottom of the oven. Then the door 54, is raised, and the gas is lighted and cooking proceeds in the usual manner. Now if food is to be broiled the locking dog 43, is disengaged from the tooth 42, and the burner is turned on its pivots to the elevated position shown in Fig. 1, and the locking dog will engage with the end tooth 42ª, and hold the burner in position. The tooth 42ª, is so arranged that the weight of the burner when elevated is slightly in advance of the pivotal points so as to retain the dog and tooth in operative position. Otherwise the burner might fall by gravity to the lower position.

When the burner is elevated in broiling position, the openings 37 cause the flame to flare in a downward direction and a piece of meat or the like food on the shelf 56, will be quickly broiled and when completed the burner can with convenience be thrown out of position.

When solid fuel is used, it is of considerable importance to swing the burner 35 out of the way entirely. Therefore, the intermediate tooth 42ᵇ is located between the other teeth on the arm 40 so that when the burner is given a half turn on its pivots, it will lie close to the rear wall of the oven, as shown in Fig. 2 and the dog will by engagement with the tooth 42ᵇ, support the burner in this position. The burner will therefore be out of the way of the under part of the oven, and will also give a greater space between the shelf 56 and the top of the oven, which is frequently necessary when cooking large roasts or big fowl.

It will thus be seen that by constructing the oven burner as described it may be manipulated to accommodate various conditions when using the stove, either with solid or gaseous fuel.

It will of course be understood that the oven burner can be used in conjunction with solid fuel in the fire pot that is to say if a low fire be burning in the fire pot, and it should be found necessary to increase the heat in the oven, or utilize the burner for broiling it is obvious both means could be used at the same time.

From the foregoing description, it will be manifest to those skilled in the art to which my invention appertains that I have constructed a combined solid and gaseous fuel burning stove, which will be safe, and economical, and one that may be used with either class of fuel separately or combined. Furthermore it will be obvious that I may make many minor changes without departing from the spirit and scope of my invention.

78 indicates a shelf on the stove, on which the lids of the stove may be placed when using the gas burners.

What I claim is:—

1. In a combined solid and gaseous fuel burning stove, the combination of a casing, a fire pot in the casing, an oven spaced from the walls of the casing to form a flue, a damper in the flue to cut off communication between the fire pot and flue, a gas burner supported in the flue, and spaced from the walls of the oven and the casing, means for supplying the gas burner with gas, and detachable means for protecting the gas burner from the soot and products of combustion when solid fuel is used in the fire pot, said latter means including a pivotally mounted cover adapted to swing over the burner or away from the latter.

2. In a combined solid and gaseous fuel burning stove, the combination of a casing a fire pot in the casing, an oven spaced from the walls of the casing to form a flue which is in communication with the fire pot, a damper in the flue to cut off communication between the fire pot and flue, a gas burner supported in the flue, means for supplying the gas burner with gas, detachable means for protecting the gas burner from the soot or ashes and products of combustion when solid fuel is used in the fire pot, and an auxiliary damper and flue for permitting making communication for the escape of gas from the fire pot to the atmosphere when burning gaseous fuel in the gas burners.

3. In a combined solid and gaseous fuel burning stove, the combination of a casing formed with an exit opening, a fire pot therein, an oven spaced from the casing to form a main flue which communicates with the fire pot, a damper in the flue adjacent the fire pot, an auxiliary flue and damper between the fire pot and the exit opening, a burner in the main flue, means for supplying the burner in the main flue with gaseous fuel, a pivotally mounted gas burner in the oven, means for supplying the pivotally mounted burner with gaseous fuel, a locking device for holding the pivotally mounted burner in elevated or lowered position in the oven, and detachable means for protecting the burner in the main flue when solid fuel is used in the fire pot.

4. In a combined solid and gaseous fuel burning stove the combination of a casing, formed with an exit opening, a fire pot therein, an oven spaced from the casing to form a main flue which communicates with the fire pot, a damper in the flue adjacent the fire pot, an auxiliary flue and damper between the fire pot and the exit opening, a burner in the main flue, means for supplying the burner in the main flue with gaseous fuel, a pivotally mounted gas burner provided with teeth and mounted in the oven, means for supplying the pivotally mounted burner with gaseous fuel, a locking dog to engage the teeth whereby to hold the burner in elevated or lowered position in the oven, and detachable means for protecting the burner in the main flue when solid fuel is used in the fire pot.

5. In a combined solid and gaseous fuel burning stove, the combination of a casing formed with an exit opening, a fire pot in the casing, an oven spaced from the casing to form a main flue, which communicates with the exit opening and the fire pot, burners supported in the main flue, means between the top of the casing and the burners to protect the latter when solid fuel is used in the fire pot, a damper between the burners and the fire pot to shut off communication with the latter when gaseous fuel is used in the burners, a pivotally mounted gas burner in the oven, a locking device coöperating with the pivotally mounted burner to lock said burner in elevated position to deflect the flame downwardly or to lock said burner in a substantially horizontal position in rear of the oven when not in use, and an auxiliary damper and flue for affording communication between the exit opening and the fire pot when the damper in the main flue is closed.

6. In a combined solid and gaseous fuel burning stove, the combination of a casing formed with an exit opening, a fire pot in the casing, an oven spaced from the casing to form a main flue which communicates with the fire pot, a damper in the main flue, a lower vessel support in the oven, an intermediate vessel support in the oven, a pivotally mounted gas burner in the oven, said pivotally mounted burner having a series of locking teeth, and a locking dog coöperating with the teeth whereby to lock the pivotally mounted burner under the lower vessel support or above the intermediate vessel support or in the rear of the oven.

7. In a combined solid and gaseous fuel burning stove the combination of a casing formed with an upper exit opening and a lower exit opening, a fire pot in the casing, an auxiliary flue in the rear of the fire pot which communicates with the upper exit opening and said fire pot, a damper for the auxiliary flue, an oven spaced from the casing to form a main flue around said oven, and which communicates with said fire pot and the lower exit opening under the oven, a damper adjacent the fire pot to shut off the main flue when the auxiliary flue is open, gas burners located in the main flue and over the oven, a support for the gas burners, pipes extending from the gas burners to the outside of the casing, gas supply pipes communicating with the aforesaid pipes, valves in the gas supply pipes, a pivotally mounted burner in the oven, means for holding the pivotally mounted burner in a lowered, intermediate or elevated position, shelves in the oven having their ends reduced to permit the pivotally mounted burner to be moved, the oven having openings which communicate with the main flue, and dampers for said openings.

8. In a combined solid and gaseous fuel burning stove, the combination of a casing having an exit opening, a fire pot in the casing, a flue formed in the stove, and communicating with the fire pot and the exit opening, a damper for closing the flue from the fire pot, a gas burner supported in the flue, a detachable cover for the gas burner adapted to protect the burner when solid fuel is used, said detachable cover being pivotally mounted to adapt it to cover or uncover the burner, the casing having a direct flue to provide communication between the fire pot and exit opening, and a damper for closing said flue when solid fuel is used.

In testimony whereof I have signed my name to this specification in the presence of two subscribing witnesses.

EDWIN R. CAHOONE.

Witnesses:
 GORDON S. HOPKINS,
 WILLIAM S. HOPKINS.